United States Patent [19]

Adams

[11] Patent Number: 4,524,744
[45] Date of Patent: Jun. 25, 1985

[54] FUEL SYSTEM FOR COMBUSTION ENGINE

[76] Inventor: William D. Adams, P.O. Box 461, Austell, Ga. 30001

[21] Appl. No.: 455,002

[22] Filed: Jan. 3, 1983

[51] Int. Cl.³ .................................. F02M 63/02
[52] U.S. Cl. .................... 123/459; 123/267; 123/275; 123/337; 123/401; 123/456; 123/514
[58] Field of Search ............ 123/462, 460, 456, 254, 123/266, 267, 277, 275, 514, 457, 447, 378, 401, 337, 459

[56] References Cited

U.S. PATENT DOCUMENTS

| | | | |
|---|---|---|---|
| 2,813,522 | 11/1957 | White et al. | 123/462 |
| 3,102,521 | 9/1963 | Slemmons | 123/275 |
| 3,105,478 | 10/1963 | Lyon | 123/456 |
| 3,650,258 | 3/1972 | Jackson | 123/456 |
| 3,824,965 | 7/1974 | Clawson | 123/462 |
| 3,995,604 | 12/1976 | Brandstetter | 123/277 |
| 4,074,664 | 2/1978 | Rollins | 123/267 |

Primary Examiner—Andrew M. Dolinar
Attorney, Agent, or Firm—James B. Middleton

[57] ABSTRACT

A fuel injection apparatus in which a closed fuel circuit is pressurized, and the amount of fuel injected is determined by the pressure in the circuit. Air intake by the engine is controlled in response to the amount of fuel injected. The fuel injection apparatus includes a reservoir with a fixed level of fuel, and a high pressure pump pumps fuel from the reservoir and into the fuel circuit. Fixed orifice injection nozzles communicate with the circuit so fuel is varied only by the pressure. Pressure in the circuit is varied by a valve that releases fuel into the reservoir to lower the pressure in the circuit, the valve being controlled by the conventional accelerator pedal. Air to the engine is modulated in response to fuel flow. This is accomplished by varying an air valve in accordance with pressure in the fuel circuit, or by using a constant velocity valve which would vary with engine demand.

The apparatus further includes an auxiliary chamber receivable in the spark plug hole to convert the engine to a stratified charge engine. The fuel is injected into the auxiliary chamber, and passes from the auxiliary chamber into the cylinder so the cylinder receives a lean mixture. The auxiliary chamber includes a spark plug to ignite the rich mixture, and the chamber acts as a torch to ignite the lean mixture in the cylinder.

5 Claims, 5 Drawing Figures

FUEL SYSTEM FOR COMBUSTION ENGINE

FIELD OF THE INVENTION

This invention relates generally to fuel control systems for internal combustion engines, and is more particularly concerned with a fuel injection system wherein fuel flow is altered and air flow is modulated in response thereto, the system also being usable in a stratified charge system.

BACKGROUND OF THE INVENTION

Various systems for controlling both the flow of fuel and the flow of air to an internal combustion engine have been known for a number of years. The primary control in the past has been through the use of a carburetor and the modified systems have mostly taken the form of improved carburetion devices. Also the most frequent control system for an internal combustion engine includes the varying of air flow, such as with a butterfly valve, and controlling fuel flow in response to the air flow. This of course introduces difficulties, especially when a richer mixture is needed in order to provide a greater amount of power at slower engine speeds. Because of this difficulty, many additional controls have been attempted to vary the richness of the mixture under high load conditions.

With the advent of the environmental problems, it has been found that fuel injection systems tend to be superior to carburetor systems in that better control of fuel is provided to achieve more nearly complete combustion, hence less pollution. Nevertheless, even with a fuel injection system, it is common to control the air flow by means of a butterfly valve or the like, and to vary the fuel flow on the basis of the modulated air flow. Many of the same problems therefore remain, and extremely complex systems have been devised in an effort to overcome the problem in the system. Many of the fuel injection systems include sophisticated electronic controls, but the input to the sophisticated electronics is derived from the somewhat conventional mechanical air flow devices.

It will therefore be understood that the prior art fuel and air controls for internal combustion engines have become more and more complex but have failed to solve the basic problems that are somewhat inherent in the four stroke cycle internal combustion engine.

Further, in an effort to reduce the pollution by a combustion engine, the stratified charge has been used. While the stratified charge technique wherein a precombustion chamber acts as a torch to ignite a lean mixture in the cylinder is an excellent solution for new engines, such as arrangement requires special casting and the like so that existing engines are not adaptable to conversion. There has been an effort to use the spark plug hole to receive a chamber, but the prior art has used this adaptation only to convert a spark ignition engine into a compressive ignition engine, so the modification for the conventional automobile has still not been made.

SUMMARY OF THE INVENTION

The present invention overcomes the above mentioned and other difficulties with the prior art by providing a fuel injection system for a conventional four stroke cycle internal combustion engine, the fuel injection system including a fuel reservoir with means for maintaining a level of fuel within the reservoir. Fuel is pumped from the reservoir into a closed, high pressure circuit beginning and ending with the fuel reservoir. Valve means lower the pressure in the high pressure circuit by bleeding fuel back into the reservoir. At least one fuel nozzle communicates with the high pressure circuit so that, as the pressure changes, the fuel flow through the nozzle changes. An air intake valve is also varied in accordance with the pressure in the high pressure circuit so the pressure in the high pressure fuel circuit is varied to vary the fuel flow into the engine, and the amount of air is varied in accordance with the fuel flow.

The injection nozzles for the engine can be placed to inject fuel into a removable chamber that is receivable by the spark plug hole in the conventional engine, the chamber having a spark plug therein for spark ignition of the fuel. The chamber contains an air inlet so the mixture within the chamber will be combustible and will act as a torch to ignite the very lean mixture that will result in the cylinder. The arrangement is such that all of the fuel for the cylinder is injected into the chamber, some of the fuel passing from the chamber into the main cylinder so that the chamber retains a very rich mixture while the main cylinder has a very lean mixture.

BRIEF DESCRIPTION OF THE DRAWINGS

These and other features and advantages of the present invention will become apparent from consideration of the following specification when taken in conjunction with the accompanying drawings, in which.

DESCRIPTION OF THE PREFERRED EMBODIMENT

Figure 1:
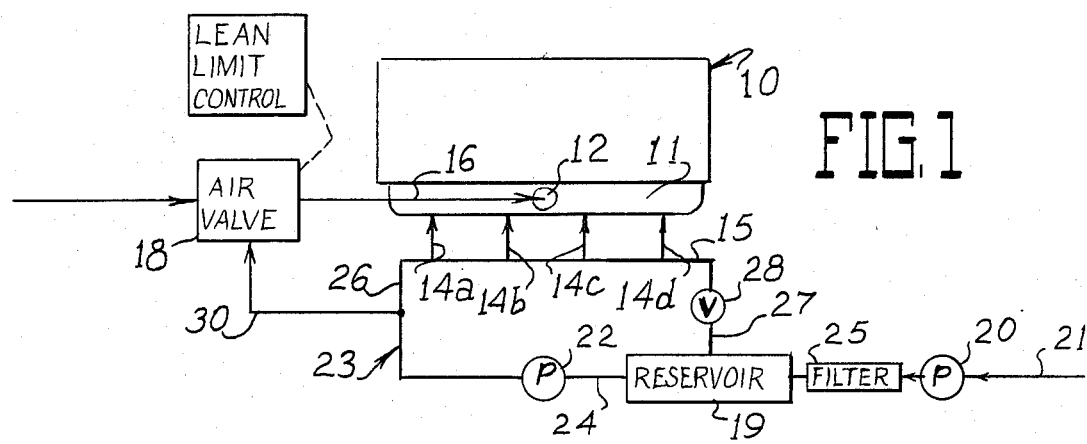
FIG. 1 is a schematic view showing the fuel injection system of the present invention along with the air control system.

Referring now more particularly to the drawings and to that embodiment of the invention here presented by way of illustration, it will be seen in FIG. 1 of the drawings that there is an engine represented at 10 having an intake manifold 11 with an air inlet indicated at 12.

The fuel injection means are shown simply as arrows at 14, and are designated as 14a, 14b, 14c and 14d. These injection means are in communication with a common feed line 15. As a result, when fuel is placed into the feed line 15 under sufficient pressure, fuel will be injected into the various cylinders of the engine 10 through the injection means.

Air is directed into the engine by admitting air through the inlet 12 from the duct indicated at 16. To control the amount of air, a valve 18 is placed into the duct 16.

At this point it should be noted that the conventional means for varying the amount of fuel in a fuel injection system is to vary the nozzle opening to meter the fuel. Fluid flow is equal to the velocity multiplied by the area of the passage, so variation of the size of the passage will vary the amount of fluid. Such a system results in very complex injection nozzles, and frequently in orifices of such size that occlusion of the nozzle is likely.

In the present system as shown in FIG. 1 of the drawings, it is contemplated that the injection means 14a, 14b, 14c and 14d will be fixed, and the pressure varied. Variation in pressure causes variation in velocity, and the variation in velocity causes the variation in fuel flow as stated above. This results in an extremely simple system that does not require complex control mechanisms.

It will be seen in FIG. 1 that the feed line 15 is one leg of a closed circuit that includes a reservoir 19 which receives a supply of fuel from, for example, a conventional fuel pump 20 through a filter 25. The pump 20 receives fuel through the fuel line 21. A high pressure pump 22 pumps fuel from the reservoir 19 through a supply line 24. The circuit continues through a tube 26 that communicates with the feed line 15; then, the feed line 15 is connected through a valve 28 in the line 27 back to the reservoir 19.

As a result of this arrangement, it will be understood that the pump 22 can be designed to provide fuel in the line 26 at a predetermined pressure. If the valve 28 is completely closed, the maximum pressure of which the pump 22 is capable will be the pressure in the feed line 15, relieved only by the injection means 14. The amount of fuel delivered through the injection means 14 will therefore be determined by the pressure delivered by the pump 22, assuming the injection means 14 have fixed orifices. It is contemplated that the pump 22 will have more than sufficient output for the engine 10, so the valve 28, in practice, will not be fully closed at any time. The excess fuel is then returned to the reservoir 19.

With the above described arrangement, in order to vary the amount of fuel delivered by the injection means 14, the pressure in the feed line 15 must be varied. Thus, the valve 28 is provided to reduce the pressure in the line 15 by opening the line to the reservoir 19. It will be understood that any form of valve may be used as the valve 28; however, for use in a conventional automobile or the like, the valve should be easily controlled by the driver of the vehicle because the valve 28 acts in response to the conventional accelerator pedal for the vehicle. One arrangement to achieve the control will be discussed hereinafter.

Looking at the air valve 18 in FIG. 1, it will be seen that there is a line 30 connected to the tube 26 and to the air valve 18. It is contemplated that an air valve 18 will be used, the valve 18 being operable to varying extents to modulate the air entering the engine. In the present system, the amount of air allowed to enter the engine 10 is determined by the amount of fuel injected into the engine. The arrangement here indicated contemplates the use of a valve that will open more as the pressure in the circuit increases, and close as the pressure decreases.

It will be understood that, when the pressure in the closed fuel circuit is high, the valve 28 will be closed or nearly closed, and the pressure on the injection means 14 will be high causing a large quantity of fuel to be injected into the engine 10. This condition indicates high speed, or high RPM for the engine, and demands more air for proper combustion. The opening of the air valve 18 in response to high pressure will therefore provide proper operation.

Conversely, when the valve 28 is open, pressure in the fuel circuit is bled into the reservoir 19 so the pressure in the circuit is low. This results in low pressure at the injection means 14, hence low fuel input, hence low RPM. Low air input is therefore called for, and it will be seen that the air valve 18 closes in response to low pressure in the fuel circuit.

The above described operation will result in good performance of the engine 10 under normal conditions. It will be recognized however, that an engine 10 operating under high load conditions requires a larger amount of fuel at lower RPM, and less air, to yield a richer fuel mixture. To achieve proper operation under this condition, the engine RPM may be monitored as is well known in the art, and the air valve 18 can be separately controlled to open less when high pressure is sensed through the line 30 but the engine RPM is low. Another technique is to utilize a lean limit control. This arrangement would require that the air valve 18 be designed always to supply less air than is demanded for proper engine operation. The lean limit control, then, bleeds in additional air as required. Thus, when the mixture becomes too lean for proper operation, as by opening the valve 18, the lean limit control closes off the additional air, and the resulting mixture is proper. The lean limit control is disclosed in U.S. Pat. No. 4,015,572, so no further discussion should be required.

It will therefore be seen that the invention as shown in FIG. 1 of the drawings provides a system that is extremely simple. The pump 22 removes fuel from the reservoir 19 and creates high pressure in the closed fuel circuit 23. With fixed orifice nozzles, since the amount of fuel injected by the injection means 14 is a function of velocity, and velocity varies with pressure, high pressure will cause high fuel feed and low pressure will cause low fuel feed. To vary the pressure in the circuit 23 for the desired operation, a valve 28 is provided to lower the pressure in the circuit 23 by releasing fuel into the reservoir 19. High pressure is of course achieved by leaving the valve 28 substantially closed so the pressure is substantially equal to the pressure of which the pump 22 is capable.

To provide the proper amount of air to mix with the fuel, the air valve 18 is operated to open with high pressure in the circuit 23, and close with low pressure in the circuit 23. The amount of air is therefore modulated in response to the amount of fuel flow.

Figure 2:
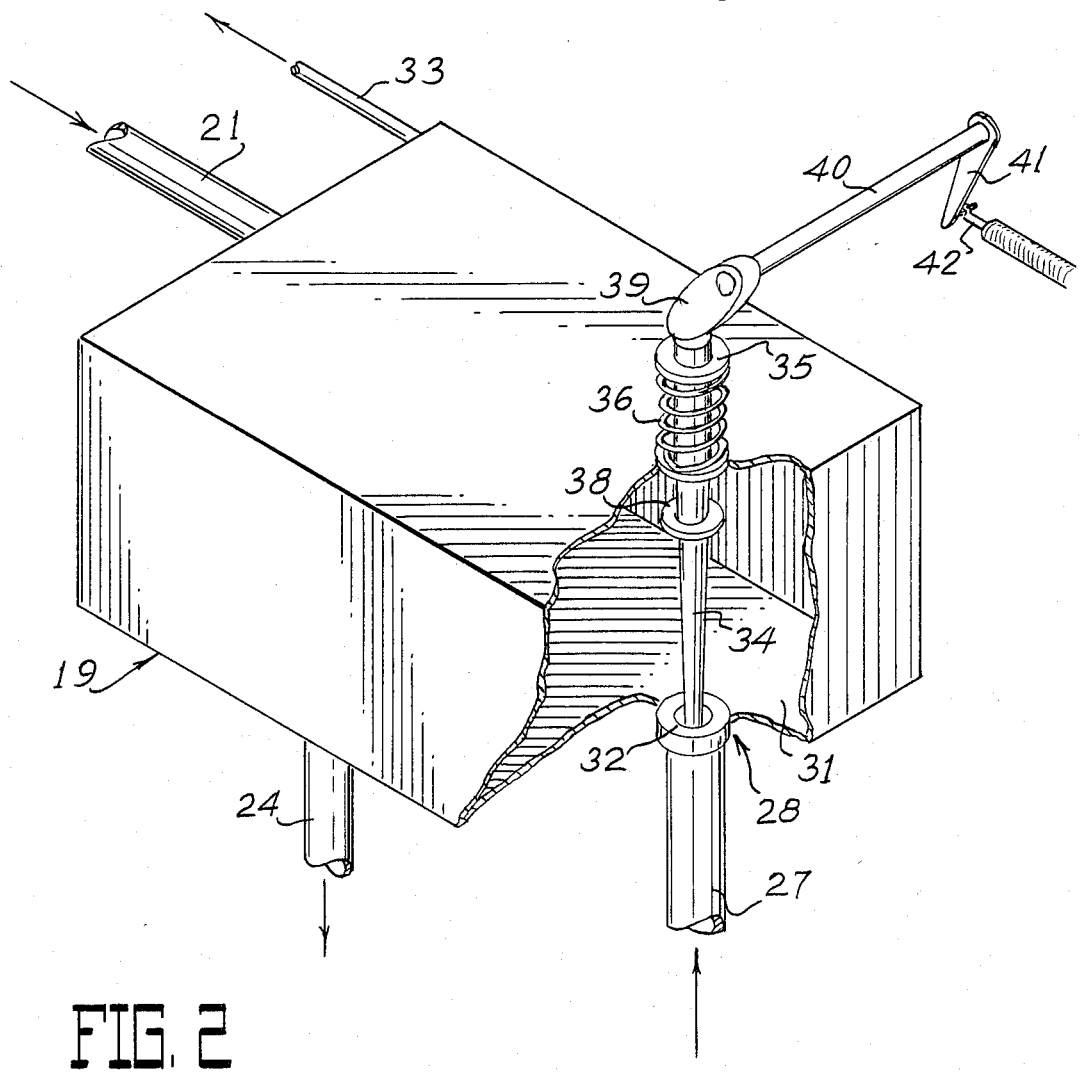
FIG. 2 is a perspective view, partially in cross-section, showing the fuel reservoir made in accordance with the present invention, and illustrating one form of pressure relief valve for the high pressure circuit.

Attention is next directed to FIG. 2 of the drawings. FIG. 2 illustrates one mechanical arrangement for the reservoir 19 in conjunction with the valve 28.

First, it will be understood that the reservoir 19 may take any desired shape, and will have a volume suitable to the engine 10. The reservoir 19 is here shown as a simple rectangular container having the inlet pipe 21 communicating therewith. It will be understood that the reservoir 19 will include a conventional float valve or other arrangement by which a minimum level of fuel is maintained within the container and a vent 33 connects to the fuel tank of the vehicle. Fuel is removed from the container through the line 24 which passes through the bottom 31 of the container.

From the foregoing discussion, it will be realized that fuel is placed into the container through the pipe 21 by means of the pump 20, and fuel is pumped from the container through the pipe 24 which is connected to the suction side of the pump 22. It will also be realized that the final leg of the closed fuel circuit 23 connects to the reservoir 19 through the valve 28. This arrangement is shown in FIG. 2 where the container is partially broken away.

The valve 28 may take many forms, including a slotted bar and orifice or the like, and as here shown the valve 28 comprises a needle valve which includes a seat 32 fixed in the bottom 31 of the container. The needle, or movable valve member, 34 is received in the seat 32, and passes through the top of the container.

Realizing that substantially closing the valve 28 yields maximum engine RPM, it will be understood that the normal, or idle position, will be with the valve 28 fully open. Thus, the needle 34 has a fixed ring 35 generally at its upper end, and a spring 36 extends between the ring 35 and the top of the container. The spring 36 will urge the needle 34 upwardly, tending to hold the valve 28 in its fully open position. A stop plate 38 is provided to limit the motion.

To increase engine RPM by increasing fuel flow to the engine 10, the valve 28 is moved towards the closed position. This is accomplished through a cam 39 mounted on a control rod 40, and having a crank arm 41. The accelerator cable 42 is connected to the crank arm 41 for operation of the assembly by means of the conventional accelerator pedal. It will therefore be seen that the operation of the valve can be varied by the selected design of the cam 39 as well as the needle 34. The desired fuel flow response can therefore be easily designed into the system.

It will therefore be understood that, when the accelerator pedal is in its fully-up position, the cam 39 will allow the needle 34 to rise to the maximum open position of the valve 28. This places the minimum pressure on the fuel feed line 15 for minimum fuel feed. When the accelerator pedal is depressed, the cable 42 will operate the crank arm 41, causing the cam 39 to rotate and urge the needle 34 towards the seat 32 to close the valve 28 somewhat. This results in higher pressure in the line 15, hence more fuel fed to the engine 10.

Figure 3:
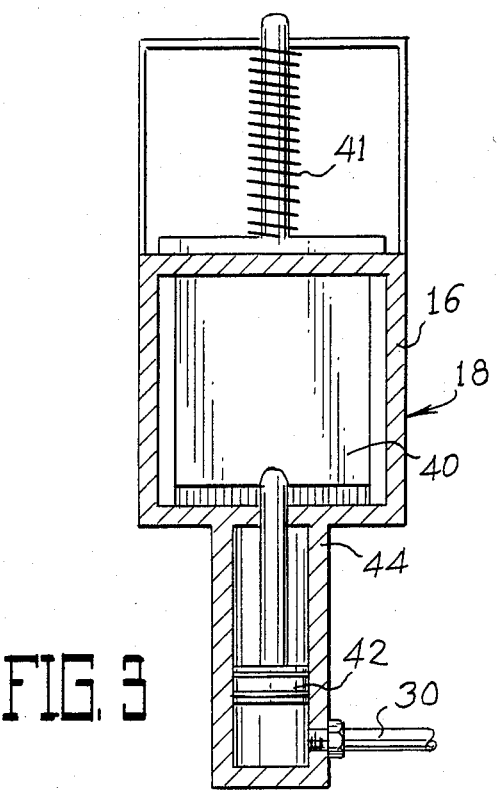
FIG. 3 is a cross-sectional view showing one form of air control valve for use in the system shown in FIG. 1.

FIG. 3 of the drawings shows one very simple form of air valve 18. The valve 18 includes a gate-type valve member 40 slidable within the air duct 16. A spring 41 urges the gate 40 to its closed position.

To raise the gate 40, a piston 42 is provided, riding within a cylinder 44. Thus, as pressure increases in the tube 30, the piston 42 is forced up against the force of the spring 41. When the pressure in the tube 30 is reduced, the spring 41 will urge the gate, hence the piston 42, down. The opening of the valve 18 is therefore responsive to the pressure in the tube 30, or the fuel circuit 23.

Another air control arrangement comprises a constant velocity control as has been used in a carburetor for a number of years. One embodiment of such a device is shown in U.S. Pat. No. 3,724,822, in FIG. 5 of the drawings, and that disclosure is incorporated herein by reference. It is contemplated that the constant velocity device will be made oblong rather than round to achieve an arrangement somewhat as shown in FIG. 3 of the drawings, and a dampening plunger should be added for steady operation. Those skilled in the art will realize that a round device will operate generally the same, but a very large device results in order to obtain the cross-sectional area desired.

Figure 4:
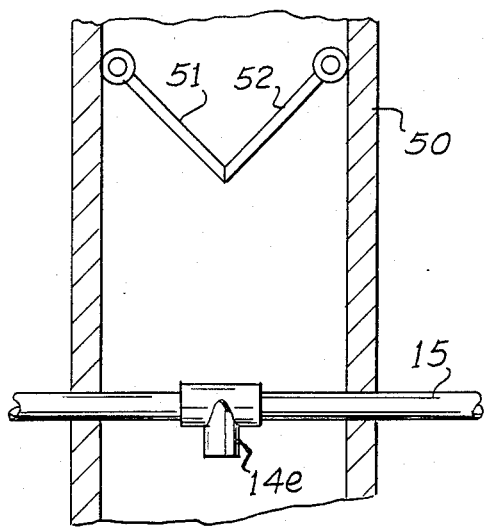
FIG. 4 is a cross-sectional view showing a single-point injection system.

The system described hereinabove is a multiple point injection system, having a separate nozzle for each cylinder of the engine 10. Those skilled in the art will realize that the invention is also adaptable to a single point injection system, and this is shown in FIG. 4 of the drawings. The member 50 represents the air inlet to the intake manifold 11, and it will be seen that the fuel feed line 15 passes through the member 50. A single injection nozzle 14e is disposed within the member 50 so that fuel dispensed by the nozzle 14e will pass into the manifold 11 to be distributed to the cylinders of the engine 10.

To control the air flow, a very simple arrangement may be used as shown in FIG. 4. A pair of flaps 51 and 52 is arranged to close the air passage through the member 50, the flaps being urged to the closed position as shown by a spring or fluid pressure. When the engine 10 is operating, the manifold vacuum will cause atmospheric pressure to open the flaps 51 and 52 against the closing force. As the amount of fuel increases as has been discussed above, the engine 10 will demand more air, and the flaps 51 and 52 will open wider.

Figure 5:
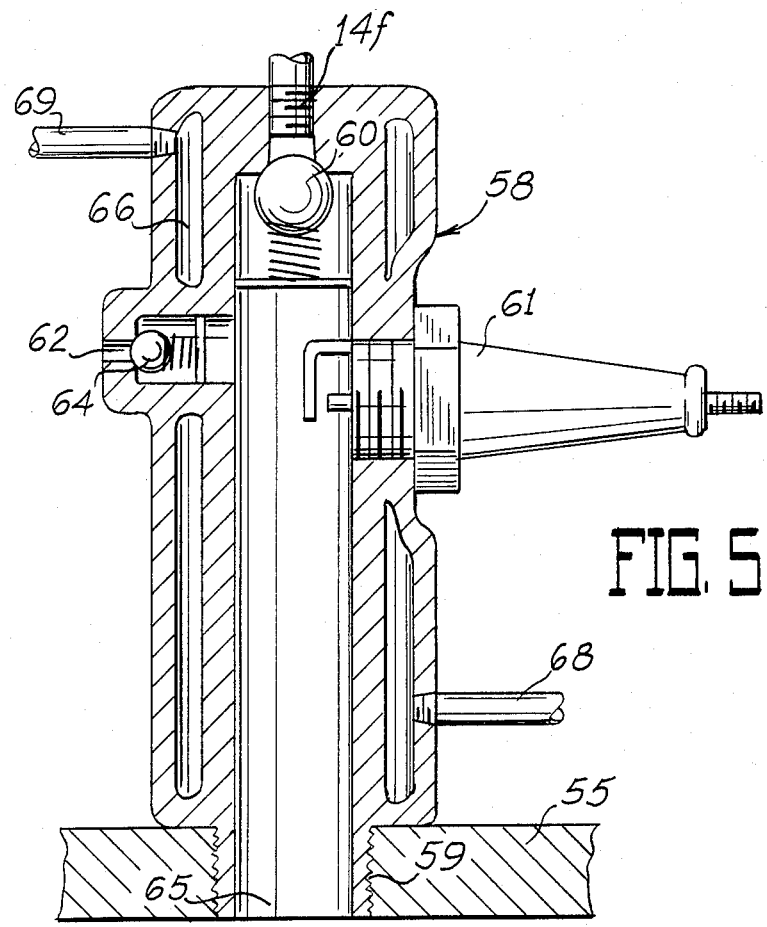
FIG. 5 is an enlarged cross-sectional view showing the stratified charge chamber for use in conjunction with the present invention.

Attention is now directed to FIG. 5 of the drawings which illustrates one of the fuel injection means 14 as the injection means can be arranged for a stratified charge adapter.

In FIG. 5, the head of the engine 10 is represented at 55, with the conventional spark plug opening at 56. It will be seen that an auxiliary, or precombustion, chamber 58 is received within the opening 56, the chamber 58 having threads 59 for threaded engagement with the conventional opening.

In the outer end of the chamber 58, the injection nozzle 14 is provided, with a check valve 60 adjacent thereto. The check valve 60 allows fuel to flow into the interior of the chamber 58 but prevents combustion gases from entering the fuel line 15.

At one side of the chamber 58 it will be seen that there is a conventional spark plug 61; and, generally opposite from the plug 61 is an air inlet 62 provided with a check valve 64.

As here shown, the chamber 58 also includes a cooling jacket 66. This can of course be supplied from the usual cooling system for an engine such as the engine 10. Inlet and outlet lines 68 and 69 are provided for connection into the system.

The opening 65 from the chamber 58 into the cylinder of the engine must be of a proper size to give proper engine operation. Those skilled in the art can readily calculate the best opening for example as stated in U.S. Pat. No. 3,830,205, issued Aug. 20, 1974. In this patent, the opening is stated to be from 0.04 to 0.20 square centimeters per cubic centimeter of volume in the auxiliary chamber.

Since the chamber 58 as here disclosed will be added to an engine not designed for such operation, it will also be understood that some additional alterations must be made to maintain proper operation of the engine. Since additional volume is being added to the cylinder, the compression ratio of the engine will be changed. Those skilled in the art will be able to make the needed alterations by milling the heads to reduce the cylinder volume, replacing the pistons with longer pistons to increase WDA the compression ratio, or using other such expedients.

Considering the operation of the engine using the chamber 58, it will be understood that, as the piston in the engine cylinder moves down on the intake stroke, the pressure in the cylinder will be reduced and fuel from the nozzle 14 will be injected into the chamber 58. Some air will also enter the chamber 58 through the port 62, both to supply oxygen for combustion and to induce swirl for mixing air with the fuel. Obviously, since there is reduced pressure within the cylinder, some of the fuel will also enter the engine cylinder.

When the piston moves up for the compression stroke, the entire cylinder and chamber 58 will be under pressure, but the mixture in the chamber 58 will be very rich while the mixture in the cylinder will be very lean. The conventional electrical system will cause the spark plug 61 to fire, igniting the rich mixture in the chamber 58. The combustion within the chamber 58 then acts as a torch to ignite the lean mixture in the cylinder as is known in the art.

It will therefore be seen that the present invention provides an extremely simple fuel injection system wherein the fuel flow to the engine is controlled directly, and the air flow to the engine is modulated in response to the fuel flow. The system is easily adaptable to a multiple point injection wherein an injection nozzle is provided for each cylinder, and is equally adapted to a single point injection system. Also, the system can be used with the auxiliary chamber to convert a conventional spark ignition engine into a spark ignition engine operating on a stratified charge.

It will therefore be understood by those skilled in the art that the embodiments of the invention here presented are by way of illustration only, and are meant to be in no way restrictive; therefore, numerous changes and modifications may be made, and the full use of equivalents resorted to, without departing from the spirit or scope of the invention as defined in the appended claims.

I claim:

1. Fuel injection apparatus, for a spark ignition internal combustion engine having at least one cylinder and an air inlet, an injection nozzle for injecting fuel into said cylinder, a fuel feed line in direct communication with said injection nozzle for supplying fuel under pressure to said injection nozzle, said fuel feed line being one leg of a closed fuel circuit, said fuel circuit further including a fuel reservoir, means for maintaining a level of fuel within said reservoir, a pump for pumping fuel from said reservoir to said fuel feed line and for creating pressure in said fuel feed line, said pump having an output greater than the maximum requirements of said engine, valve means connected in said fuel circuit between said fuel feed line and said reservoir so that opening said valve means allows fuel flow from said fuel feed line into said reservoir and releases pressure of said fuel feed line and closing said valve means retains pressure on said fuel feed line, said pressure on said fuel feed line being directly communicated to said injection nozzle, and an air valve for controlling air flow to said air inlet, said air valve including a cylinder, piston means within said cylinder, said cylinder being in fluid communication with said fuel circuit between said pump and said feed line, said piston being movable in a first direction in response to high pressure in said fluid circuit, and spring means for urging said piston means in the opposite direction, a valve member for said air valve, said valve member being moved to allow increased air flow when said piston is moved in said first direction and to close said air valve for restricting air flow when said piston is moved in said opposite direction, the arrangement being such that said pressure on said fuel feed line is the only force that urges said piston means in said first direction, and spring force of said spring means is the only force that urges said piston means in said opposite direction.

2. Fuel injection apparatus as claimed in claim 1, said reservoir comprising a generally closed container, means for placing fuel into said container, conduit means connected to the bottom of said container and to the intake side of said pump, said valve means comprising a valve seat fixed to said container and a movable needle valve member for selective engagement with said valve seat, the arrangement being such that fluid controlled by said valve means is discharged into said reservoir when such fluid passes through said valve member, and control means for selectively moving said movable needle valve member.

3. Fuel injection apparatus as claimed in claim 2, and further including spring means for urging said needle valve member towards its fully open position, said control means being adapted to close said needle valve member against said spring means.

4. Fuel injection apparatus as claimed in claim 1, and further including an auxiliary chamber, said chamber being mounted with a first end in communication with said cylinder, a second end of said chamber receiving said injection nozzle, and a spark plug mounted in said chamber for providing a spark within said chamber, said chamber further defining an air port therein, a first check valve for allowing fuel to be injected into said chamber and preventing back pressure into said injection nozzle, and a second check valve for allowing air to enter said chamber through said air port and preventing escape of gas from said chamber.

5. A method for operating an internal combustion engine including the steps of providing a reservoir of fuel for said engine, pumping said fuel around a closed circuit in a quantity greater than the maximum requirement of said engine and returning at least some fuel to said reservoir, feeding fuel injection nozzles having fixed orifices from said closed circuit so that the amount of fuel injected varies with the pressure in said closed circuit, varying a valve means to drain said closed circuit into said reservoir so that a more open valve member drains more fuel into said reservoir to lower the pressure in said closed circuit and a less opened valve member restricts fuel flow into said reservoir to raise the pressure in said closed circuit, directing the fuel under pressure in said closed circuit into an air valve operating means whereby greater pressure in said closed circuit further opens an air valve to admit more air to said engine, and constantly exerting a spring force on the air valve tending to close the air valve so that said air valve is urged towards a closed position by only said spring force, and said air valve is urged towards an open position only under the influence of pressure in said closed circuit, and adding further quantities of air when needed to achieve the desired fuel and air mixture for said engine.

* * * * *